2 Sheets—Sheet 1.

E. C. GILLETT & J. F. POOLE.
CORN-PLANTERS.

No. 194,901. Patented Sept. 4, 1877.

Witnesses:

Inventors
E. C. Gillett
J. F. Poole
per T. H. Alexander & Co.
Attorneys.

2 Sheets—Sheet 2.

E. C. GILLETT & J. F. POOLE.
CORN-PLANTERS.

No. 194,901. Patented Sept. 4, 1877.

Witnesses:

Inventors.

UNITED STATES PATENT OFFICE.

ERY C. GILLETT AND JOSEPH F. POOLE, OF MONROE, WISCONSIN.

IMPROVEMENT IN CORN-PLANTERS.

Specification forming part of Letters Patent No. 194,901, dated September 4, 1877; application filed March 21, 1877.

*To all whom it may concern:*

Be it known that we, E. C. GILLETT and J. F. POOLE, of Monroe, in the county of Greene and State of Wisconsin, have invented certain new and useful Improvements in Corn-Planters; and we do hereby declare that the following is a full, clear, and exact description thereof, reference being had to the accompanying drawings, and to the letters of reference marked thereon, which form part of this specification.

The nature of our invention consists in the construction and arrangement of a corn-planter, as will be hereinafter more fully set forth.

In order to enable others skilled in the art to which our invention appertains to make and use the same, we will now proceed to describe its construction and operation, referring to the annexed drawings, in which—

Figure 1:
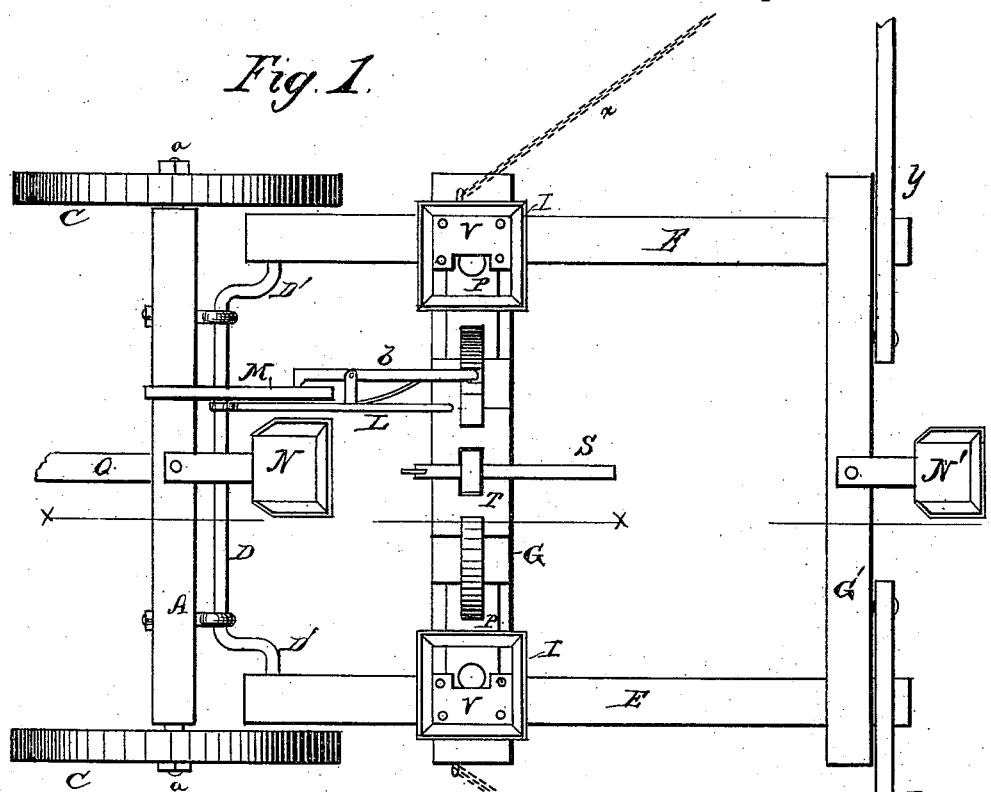
Figure 2:
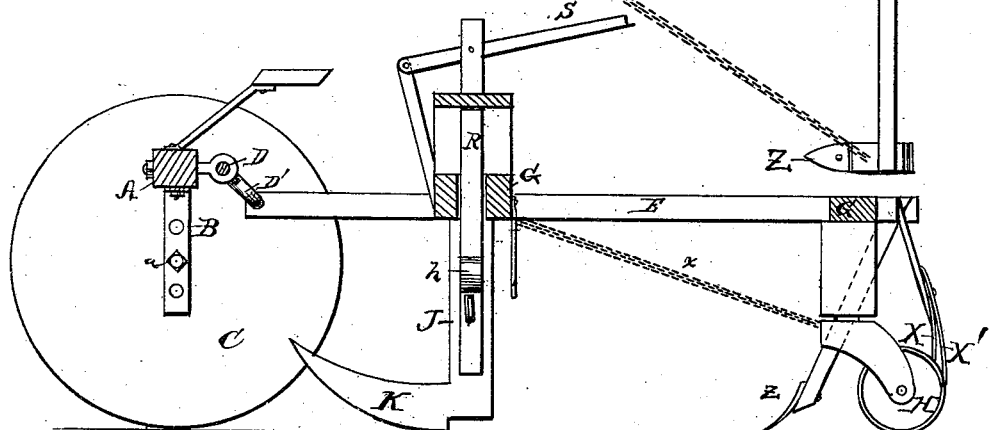
Figure 3:
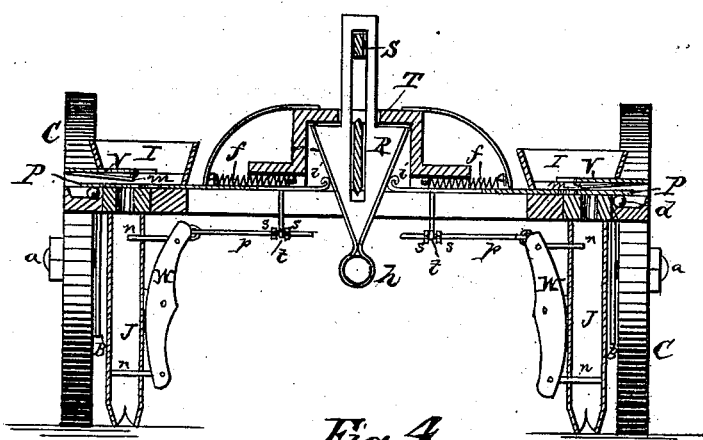
Figure 4:
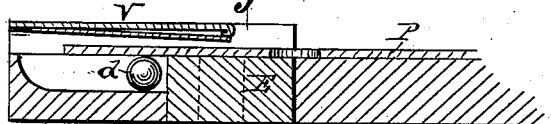
Figure 5:
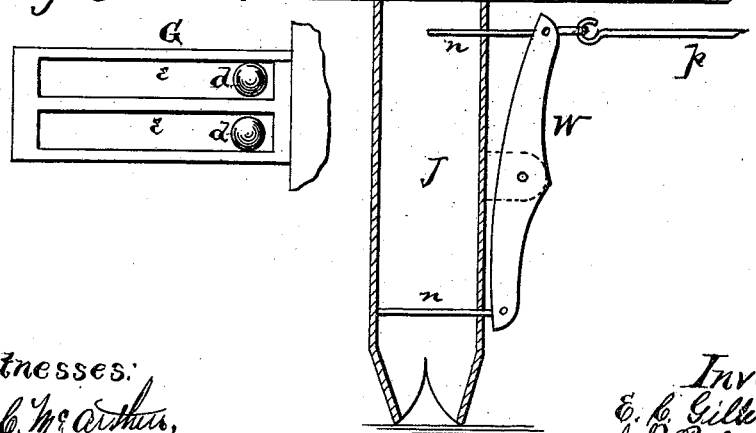

Figure 1 is a plan view of our machine. Fig. 2 is a longitudinal section of the same through the line $x\ x$, Fig. 1. Fig. 3 is a cross-section through the centers of the corn boxes or hoppers. Figs. 4 and 5 are enlarged detailed views of parts thereof.

A represents the axle-tree, provided at each end with a downwardly-projecting arm, B, through which is passed a bolt or spindle, $a$, to receive the wheel C. The arms B B are perforated with a number of holes, so that the spindles $a$ may be adjusted up or down, as required, to adjust the wheels to any desired height thereon.

In suitable boxes on the rear side of the axle-tree A is placed a shaft, D, having a crank, D', at each end, and on these cranks are placed the front ends of two beams, E E, which are connected by two cross-bars, G G', mortised into the side beams. The rear end of this frame is supported upon caster-wheels H H, the rims of which may be smooth or level, or concave, as desired, for covering the corn, they running directly behind the dropping-conductor.

The front cross-bar G supports the two corn-boxes or hoppers I I, and to its under side are attached the conductors J J, having furrow-openers K K, projecting forward from their lower ends.

On the shaft D is secured a lever, L, provided with a spring-dog, $b$, which takes into a perforated segment or ratchet, M, fastened to the axle-tree. By means of this lever the planter-frame may be adjusted up or down at its front end, so as to adjust the depth at which the furrow-openers H are to work, as well as to raise them entirely out of the ground. The lever M is operated by the driver from his seat N, supported upon the axle-tree A, directly in rear of the tongue O, secured to said axle-tree. The dropping mechanism is operated by another person, seated on another seat, N', supported by the rear cross-bar G' of the frame.

The top of the front cross-bar G is recessed to receive the dropping-slides P P, which rest and move upon balls $d\ d$, placed in grooves E E made in the bottom of said recesses, whereby said slides move with but little friction. The slides P P are moved inward by means of springs $f f$, and they are forced outwards by means of a V-shaped slide, R, moved vertically through a suitable guide-box, T, by means of a pivoted lever, S. Or said operating-slide R may be forced downward by the operator's foot, there being for that purpose a stirrup, $h$, attached to the lower end of said slide.

The inner end of each dropping-slide P forms a cam, $i$, that rests against the inclined side of the slide R, whereby the action of the springs $f$ in moving the slides P inward also forces the slide R upward, so as to be ready to be forced down by the lever S again.

Above each dropping-slide P, in the hopper I, is a bottom plate, V, to the under side of which is fastened a spring, $m$, to act as a cut-off, and prevent the breaking of the corn as it passes under the bottom plate V.

To suitable lugs or ears on the inner side of each conductor J is pivoted a lever, W, provided at each end with a valve, $n$, entering the conductor, for forming the cut-offs in the same. The upper end of the lever W is provided with a rod, $p$, which extends inward and passes through an eyebolt, $t$, fastened in and projecting downward from the dropping-slide P. On the rod $p$, on opposite sides of the eyebolt $t$, are screwed nuts $s\ s$, by means of which the rod $p$ is adjusted out or in, as required, to properly regulate the working of the valves $n\ n$. These valves are thus operated by the movement of the dropping-slides P.

Y Y are marker-arms, each of which is pivoted to the back of the rear cross-bar G' of the frame, and rests upon the projecting rear end of the side beam E. At the outer end of the arm Y is attached a small shovel, Z, forming the marker, and to said arm are further attached scrapers X X', to keep the wheel H free from dirt. $x$ is a chain connecting the marker with the front end of the frame.

If desired, the markers may be raised and supported by the front scraper X resting on the rear end of the side beam E.

Having thus fully described our invention, what we claim as new, and desire to secure by Letters Patent, is—

1. In combination with the axle-tree A, having the driving-wheels C C, and the planter-frame E G G', supported at its rear end by the caster-wheels H, we claim the crank-shaft D, placed in boxes on the axle, and having the frame placed on the cranks at its ends, and the lever L, whereby the front end of the planter may be adjusted up and down, as required, with relation to the axle, substantially as and for the purposes herein set forth.

2. In a corn-planter, the combination of the dropping-slides P and the balls $d$, placed in grooves $e$ under the same, substantially as and for the purposes herein set forth.

3. In combination with the lever W and its valves $n\ n$, the adjustable rod $p$ with nuts $s\ s$, the eyebolt $t$, and the dropping-slide P with spring $f$, substantially as and for the purposes herein set forth.

4. The combination, with the planter-frame and its wheels H, of the pivoted marker-arms Y, scrapers X X', marker Z, and chain $x$, substantially as and for the purposes herein set forth.

In testimony that we claim the foregoing as our own we affix our signatures in presence of two witnesses.

E. C. GILLETT.
     J. F. POOLE.

Witnesses:
 THOS. EMERSERY,
 J. E. DIXON.